United States Patent [19]

Jones

[11] 3,944,349
[45] Mar. 16, 1976

[54] SHUTTER ASSEMBLY

[75] Inventor: Peter Ronald Wright Jones, Brisbane, Australia

[73] Assignees: Multiscreen Corporation Limited; Eclair Corporation of America

[22] Filed: Jan. 16, 1970

[21] Appl. No.: 3,543

[52] U.S. Cl. ............... 352/184; 226/4; 226/59; 352/204
[51] Int. Cl.² ......................................... G03B 1/00
[58] Field of Search .......... 352/184, 204, 208, 219; 226/59, 4

[56] References Cited
UNITED STATES PATENTS

| | | | |
|---|---|---|---|
| 1,244,920 | 10/1917 | Thomas | 352/184 X |
| 3,135,159 | 6/1964 | Fabregat et al. | 352/184 |
| 3,165,250 | 1/1965 | Ewald et al. | 352/184 X |
| 3,397,827 | 8/1968 | Heisler | 352/184 X |
| 3,600,073 | 8/1971 | Shaw | 352/184 |

*Primary Examiner*—Monroe H. Hayes
*Attorney, Agent, or Firm*—Rogers, Bereskin & Parr

[57] ABSTRACT

A shutter assembly is coupled to a rotor of a rolling loop mechanism for use in a cimematographic film projector. The shutter assembly includes a plurality of curved plates, each of which is positioned about a gap in the rotor such that the plate is connected by its ends to the sides of the gap and extends inwardly of the rotor to provide clearance for a rolling loop of film. A stator is provided to combine with the rotor for guiding the film past an aperture and as a shutter plate passes the aperture projection light is cut off from the aperture.

2 Claims, 8 Drawing Figures

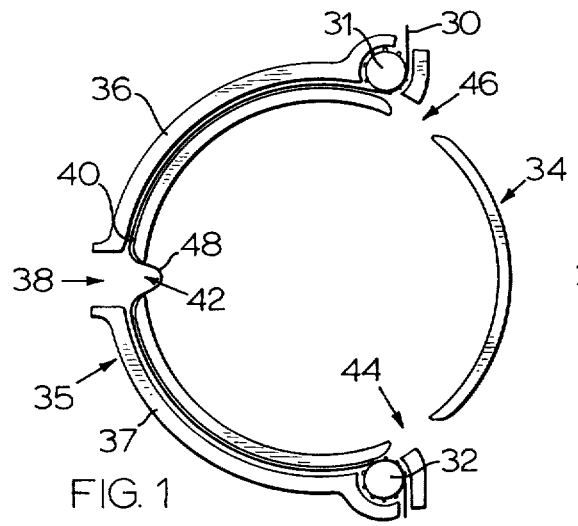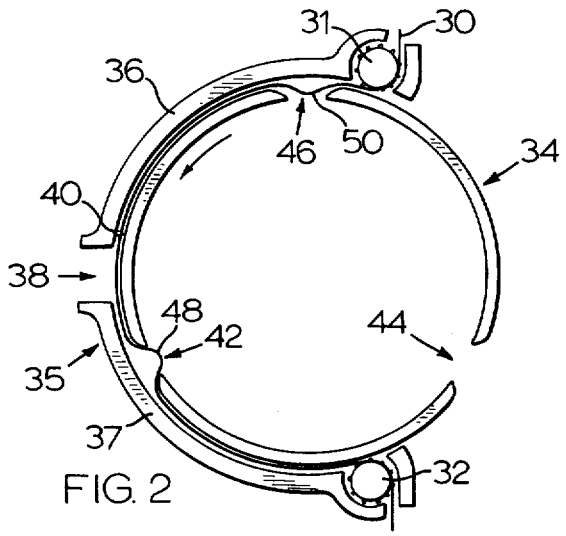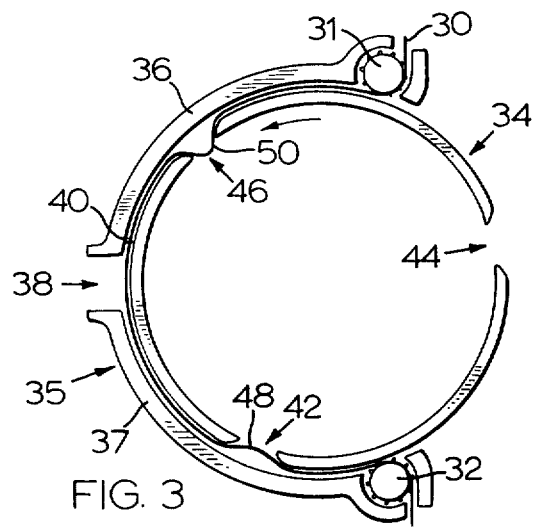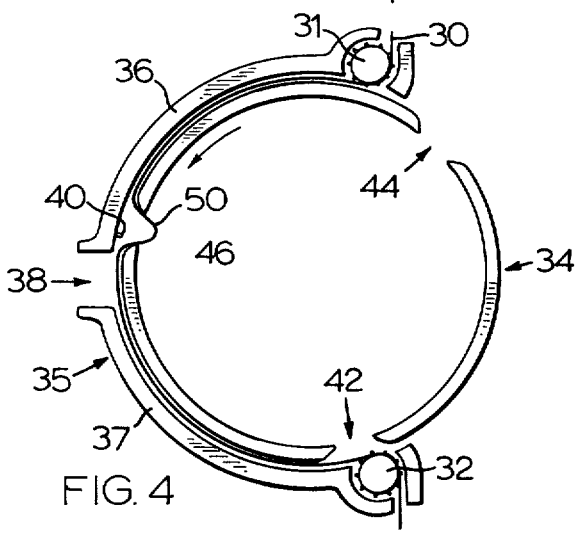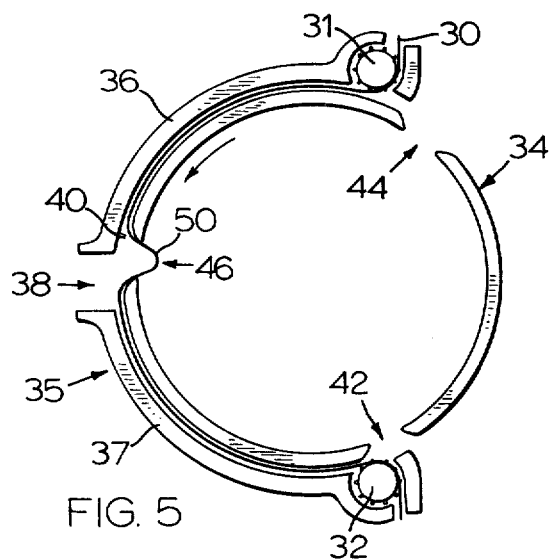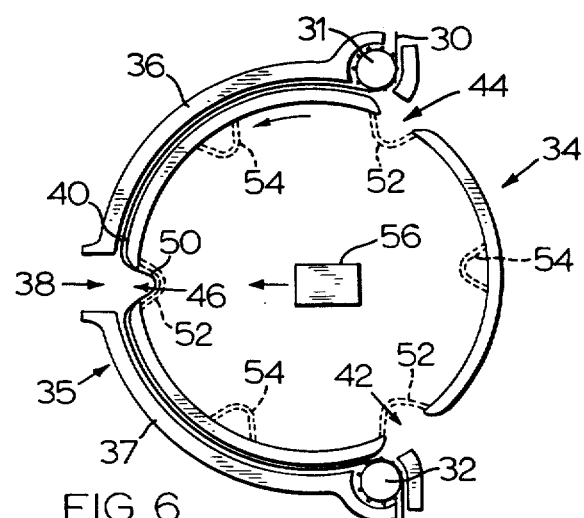

SHUTTER ASSEMBLY

This invention relates to a shutter for cinematographic film projectors of the type having a rolling loop film transport mechanism, as described in co-pending U.S. application Ser. No. 789,633 filed Jan., 1969 now U.S. Pat. No. 3,494,524.

Essentially the rolling loop mechanism includes a rotor having gaps and a curved stator which partly surrounds the rotor, the film being guided between the rotor and the stator. The stator has an aperture through which light is projected. Loops of film are formed in the moving gaps and these loops move one frame length each time a loop passes a stationary locating pin on the stator. The loop is developed continuously in a rotor gap by a driven input sprocket as the gap travels from a film inlet to the stator aperture, and the loop decays continuously as it travels from the aperture to a driven output sprocket. The stationary pin is located adjacent the aperture for locating the film at the aperture. Although the rolling loop mechanism can be linked mechanically to a conventional shutter mechanism for interrupting the light passing through the film at the aperture, I have devised a unique shutter for use with rolling loop mechanisms that is considerably simpler and more economical than conventional shutters.

In a preferred form, the invention comprises a shutter assembly coupled to a rotor of a rolling loop mechanism for use in a cinematographic film projector. The shutter assembly includes a plurality of curved plates each of which is positioned about a gap in the rotor such that the plate is connected by its ends to the sides of the gap and extends inwardly of the rotor to provide clearance for a rolling loop of film. A stator is provided to combine with the rotor for guiding the film past an aperture and as a shutter plate passes the aperture projection light is cut off from the aperture.

Further objects and advantages of the invention will appear from the following description, taken with the accompanying drawings in which:

FIGS. 1 to 6 are diagrammatic plan views of a rolling loop mechanism drawn in sequence to illustrate the principle of operation of the mechanism;

Figure 7:
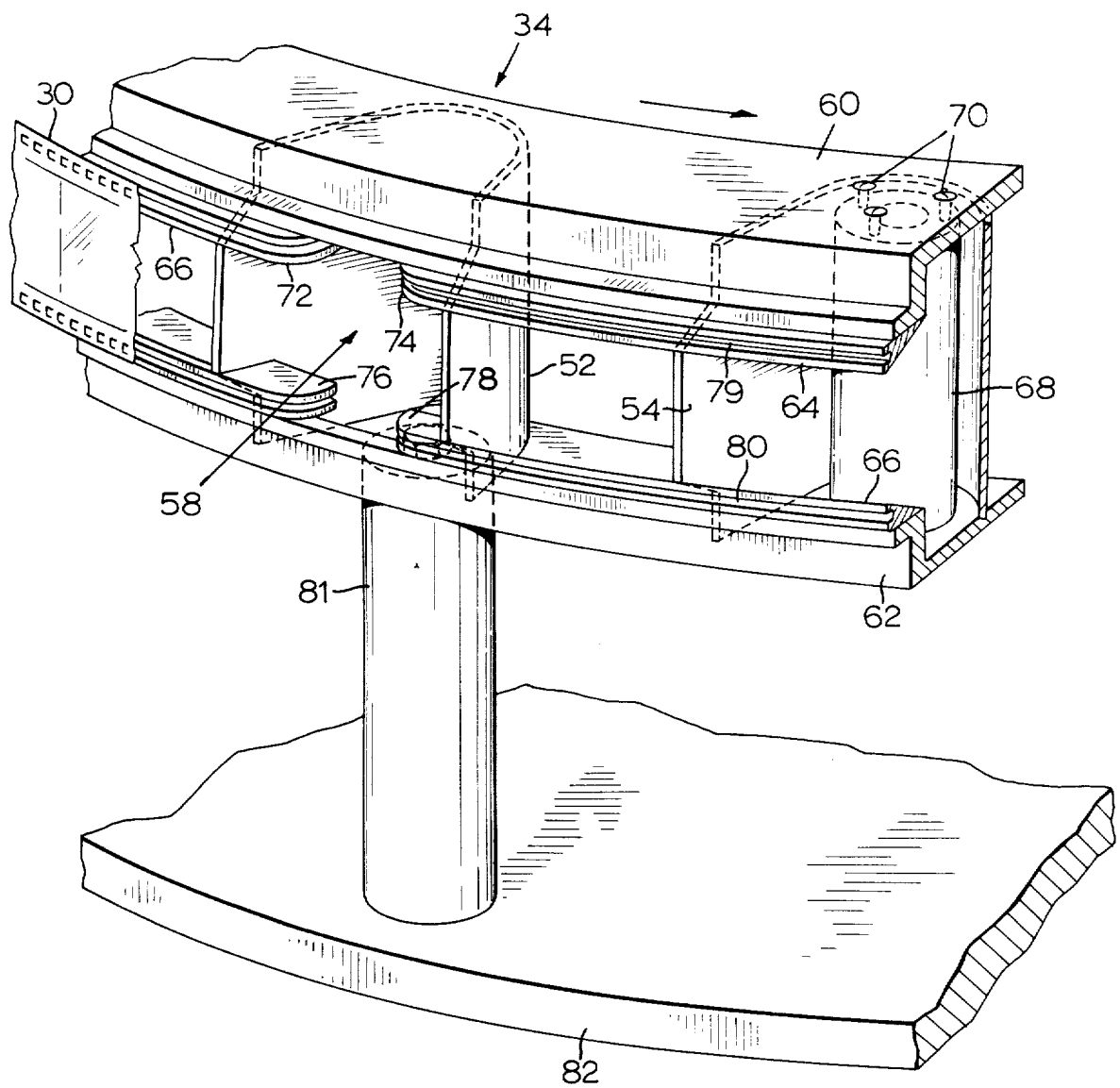
FIG. 7 is a perspective view of a portion of a rotor for a projector according to the invention.

Reference is first made to FIGS. 1 to 6 to describe the principle of operation of a rolling loop film transport mechanism similar to that described in the aforementioned co-pending application. A film 30 is fed into the mechanism at a predetermined rate by a driven inlet sprocket 31 and is drawn from the mechanism by a driven outlet sprocket 32 at the same predetermined rate. An annular rotor 34 is driven at constant speed inside a stator 35 which includes an inlet portion 36 and an outlet portion 37. The portions 36 and 37 are fixed to the mechanism about an aperture 38 with sufficient radial clearance from the rotor 34 for the film 30 to move freely. During projection, the film 30 is located by a fixed pin 40 which is attached to the inlet stator 36 adjacent the aperture 38. The rotor has three equally spaced peripheral gaps 42, 44, 46 in which film loops are formed and moved around the stator 35 by the rotor 34. In the position shown in FIG. 1, a loop 48 in the film 30 is located in the opening 42 opposite the aperture 38. The film is located on the pin 40 so that the portion of the film between the pin 40 and the inlet sprocket 31 is stationary. As the rotor 34 turns, and the sprockets 31 and 32 continue to transport the film 30, the mechanism moves into the position shown in FIG. 2 in which the loop 48 has decayed somewhat and a new loop 50 is being formed in the gap 46. The film is stationary between the openings 42 and 46 and projection takes place at this time. As the inlet sprocket 31 continues to feed film into the mechanism, the loop 50 grows to take up the excess film. Also, as the outlet sprocket 32 continues to draw film out of the mechanism, loop 48 decays as the sprocket 32 transports the film. The rotor 34 continues to move and next reaches the position shown in FIG. 3 where the loop 50 is continuing to grow and the loop 48 is decaying. As the loop 50 begins to pass over the pin 40, (FIG. 4) the film is lifted off the pin 40 so that the film between the loop 50 and the outlet sprocket 32 is free to move. The trailing side of the loop 50 then moves over the pin 40 as shown in FIGS. 5 and 6 whereupon the film is again located on the pin 40 and the portion of the film between loop 50 and inlet sprocket 30 is stopped. The gap 46 is then opposite the aperture 38. The excess film in each full loop corresponds to a frame length so that in moving the film off the pin 40 and then re-engaging the pin 40, the film is transported through one frame length. The position shown in FIG. 6 is therefore similar to that shown in FIG. 1 but with the film transported through one frame length and the rotor moved through one third of a revolution to bring the gap 46 opposite the aperture 38.

The rolling loop mechanism described above can be utilized in a projector, for example, without the use of a separate shutter of a conventional kind by bridging the gaps with primary shutters 52 and adding secondary shutters 54 midway between the primary shutters 52 so that each frame is projected twice as is conventional in motion picture projectors. Light is projected from a source 56 towards the aperture 38 for projecting the film 30 as will be explained.

Reference is next made to FIG. 7 to more fully describe the rotor 34 in use with shutters 52, 54 which adapt the rotor for use in a projector. FIG. 7 shows a portion of the rotor 34 having a primary shutter 52 bridging a gap 58 and a secondary shutter 54 placed midway between the shutter 52 and the preceding primary shutter (not shown). The rotor 34 consists of first and second annular elements 60, 62 which support replaceable guide shoes 64, 66 respectively for guiding the film 30. The elements 60, 62 are rigidly connected by pillars 68 (one of which is shown) and each pillar is located within a secondary shutter 54. The pillars 68 are connected by screws 70 to the element 60, and by similar screws (not shown) to the element 62. For optical reasons the opposing faces of the shoes 64, 66 diverge inwardly over the portion of their length between shutters. At their ends the shoes 64 have curved portions 72 and 74 which define the respective trailing and leading sides of the gap 58. Similar curved portions 76, 78 of the shoes 66 further define the gap 58. The shoes 64, 66 also have outwardly facing grooves 79, 80 to provide clearance for locating pins 40 (FIG. 1) as the rotor passes the pins. Element 62 is connected by cylindrical members 81 (one of which is shown) to a support plate 82 which is rotatably driven about the axis of the rotor 34 as will be described with reference to FIG. 8. The shutters 52, 54 are both curved although shutter 54 may be generally flat because it does not receive a loop. However for optical reasons the shutters 52, 54 should have the same circumferential extent so that each shutter interrupts projection light for a predetermined time period. The shutters 52, 54 are curved and generally U-shaped and fitted between the elements 60, 62 and the shoes 64, 66. The shutters can be spot welded in place or attached by conventional fasteners to the rotor.

Figure 8:
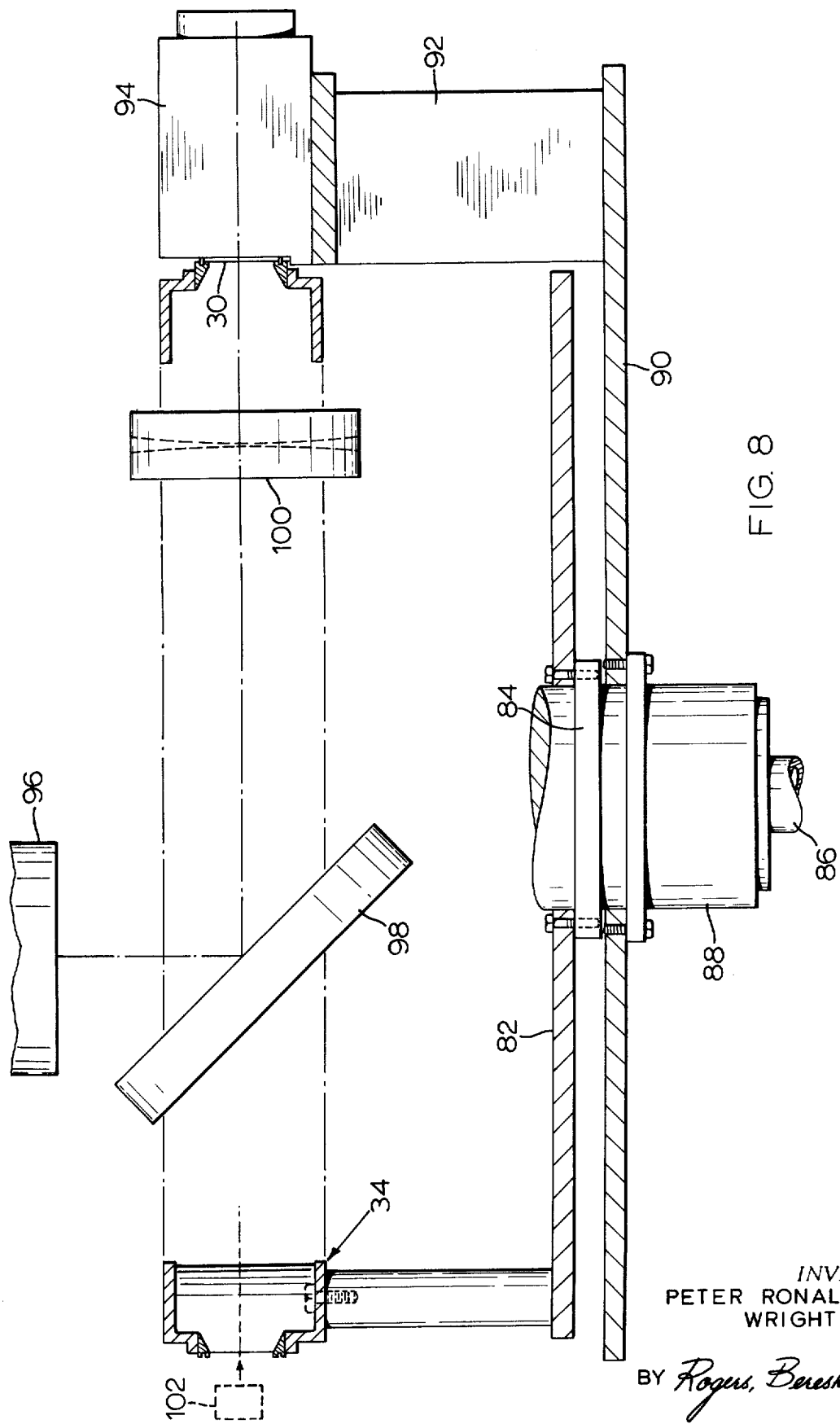
FIG. 8 is a diagrammatic sectional view through the projector.

Reference is next made to FIG. 8 which is a diagrammatic view of a section through the projector of FIG. 7 with the rotor in position for projection. The support plate 82 is mounted on a flange 84 which in turn is coupled to a drive shaft 86 and the shaft 86 is journalled in a bearing housing 88. A stationary base plate 90 supports both the housing 88 and a bracket 92 on which is mounted an optical lens system 94 for focusing light which passes through the film 30 onto a screen (not shown). The light originates in a lamphouse 96 from which it passes to a mirror 98 and on through a compound lens 100 to the film 30. Alternative light systems are possible. For instance light can be focussed from a source 102 diametrically through the rotor 34. A further alternative arrangement is to project light in the reverse direction to that shown. In this case light would be projected radially from outside the rotor 34 through the film and into a lens system back to the mirror 98 and then to a lens system which would focus the light on a screen. However all these variations in the light path use a shutter which bridges the gap thereby cutting off light as the shutter passes the light path.

More or less shutters than those described can be used, if desired. For example, if each frame is to be projected three times then two secondary shutters would be employed between each pair of primary shutters. Also for smaller projectors the shutters can be integral parts of the rotor so that the pillars 68 would not be needed.

What I claim as my invention is:

1. A motion picture projector for intermittently transporting a film through a predetermined frame length in relation to a projection aperture and for projecting said film at said aperture, said projector comprising: a stator, a rotor co-operating with said stator to define a passage for said film, said rotor having gaps for receiving film loops; an inlet in said stator through which said film is fed into said passage; an outlet in said stator through which said film is withdrawn from said passage, said aperture being intermediate said inlet and said outlet; film moving means for feeding said film into said inlet at a controlled speed relative to the speed of said rotor and for withdrawal of said film from said outlet at said controlled speed; film locating means for co-operating with said film moving means for gradually increasing and then gradually decreasing said film loop in said gap and for intermittently holding said film in fixed position in registration with said aperture; light source means for directing light through said aperture to project said film; and at least one primary shutter coupled to said rotor, said primary shutter comprising a curved plate bridging a gap, whereby said primary shutter cuts off the light passing through the film as said gap passes said aperture.

2. A projector as claimed in claim 1 wherein there is a plurality of said primary shutters and wherein said projector further comprises secondary shutters coupled to said rotor adjacent the periphery of said rotor, each one of said secondary shutters being midway between adjacent primary shutters and having a peripheral extent substantially equal to that of one of said primary shutters.

* * * * *